(12) United States Patent
Van Dorst

(10) Patent No.: US 6,935,813 B2
(45) Date of Patent: Aug. 30, 2005

(54) CONTROL MECHANISM, AN INSTALLATION AND A METHOD FOR TRANSPORTING BULK MATERIAL, GRANULAR MATERIAL OR POWDERY MATERIAL THROUGH A CONVEYOR LINE

(75) Inventor: Cornelius Ludovicus Antonius Van Dorst, Arendonk (BE)

(73) Assignee: Q-Engineering BVBA, Beerse (BE)

( * ) Notice: Subject to any disclaimer, the term of this patent is extended or adjusted under 35 U.S.C. 154(b) by 0 days.

(21) Appl. No.: 10/221,656

(22) PCT Filed: Mar. 16, 2001

(86) PCT No.: PCT/EP01/03179

§ 371 (c)(1),
(2), (4) Date: Jan. 7, 2003

(87) PCT Pub. No.: WO01/68483

PCT Pub. Date: Sep. 20, 2001

(65) Prior Publication Data

US 2003/0185635 A1 Oct. 2, 2003

(30) Foreign Application Priority Data

Mar. 16, 2000 (NL) .............................................. 1014666

(51) Int. Cl.⁷ .............................................. B65G 51/16
(52) U.S. Cl. .............................. 406/14; 406/95; 137/114
(58) Field of Search .............................. 406/14, 93, 94, 406/95; 137/111, 114, 487.5

(56) References Cited

U.S. PATENT DOCUMENTS

| | | | | |
|---|---|---|---|---|
| 2,781,234 A | * | 2/1957 | Boisture et al. ............... | 406/14 |
| 3,671,079 A | * | 6/1972 | Huffaker ...................... | 406/137 |
| 3,738,107 A | * | 6/1973 | Miller .......................... | 60/241 |
| 4,311,160 A | * | 1/1982 | Charland ..................... | 137/111 |
| 4,529,336 A | * | 7/1985 | Shinozaki et al. ............ | 406/14 |
| 4,607,987 A | | 8/1986 | Kice ............................ | 406/14 |
| 4,715,748 A | * | 12/1987 | Krambrock .................. | 406/11 |
| 4,745,941 A | * | 5/1988 | Nilsson ....................... | 137/114 |
| 4,747,731 A | * | 5/1988 | Nagasaka et al. ............. | 406/14 |
| 4,909,676 A | | 3/1990 | Heep et al. .................... | 406/14 |
| 4,955,761 A | | 9/1990 | Federhen et al. ............. | 406/12 |
| 5,071,289 A | | 12/1991 | Spivak ........................ | 406/11 |
| 5,240,355 A | | 8/1993 | Hudalla ....................... | 406/95 |
| 5,584,612 A | | 12/1996 | Nolan .......................... | 406/11 |
| 6,106,202 A | | 8/2000 | Nolan .......................... | 406/11 |
| 6,200,071 B1 | | 3/2001 | Karasawa .................... | 406/194 |
| 6,386,800 B1 | | 5/2002 | van Eyck ..................... | 406/95 |
| 6,786,681 B2 | * | 9/2004 | Grasshoff .................... | 406/11 |
| 6,830,061 B2 | * | 12/2004 | Adams et al. ................ | 137/12 |

FOREIGN PATENT DOCUMENTS

| | | | |
|---|---|---|---|
| DE | 1781025 | 8/1970 | |
| DE | 1900355 | 9/1970 | |
| DE | 2412142 | 9/1974 | .......... B65G/53/58 |
| EP | 0 446 520 A2 | 9/1991 | ............. F23K/3/02 |
| GB | 1427570 | 3/1976 | .......... B65G/53/12 |

* cited by examiner

*Primary Examiner*—Joe Dillon, Jr.
(74) *Attorney, Agent, or Firm*—Howrey LLP

(57) ABSTRACT

A control mechanism (20; 70) and a method for use in an installation for transporting bulk material, granular material or powdery material through a conveyor line (1) with the aid of a pressurized gaseous medium. The control mechanism (20; 70) is arranged for being connected to the conveyor line (1) for the purpose of introducing a pressurized gaseous medium (15) therein and comprises a connecting opening (24) for connecting the control mechanism (20; 70) to an inlet (25) in the conveyor line (1), an intake (26) for gaseous medium (15), which is in communication with the connecting opening (24), valve means (28; 71), which operatively engage the intake (26), and means (31, 32, 35, 50, 51; 32) for controlling the valve means (28; 71) associated with the pressure of the gaseous medium in the conveyor line (1). The control mechanism (20; 70) is arranged for directly controlling the control valve (28; 71) in response to the sensed pressure in the conveyor line (1) for the purpose of metering the pressurized gaseous medium (15) that is being delivered thereto.

30 Claims, 5 Drawing Sheets

Figure 1:
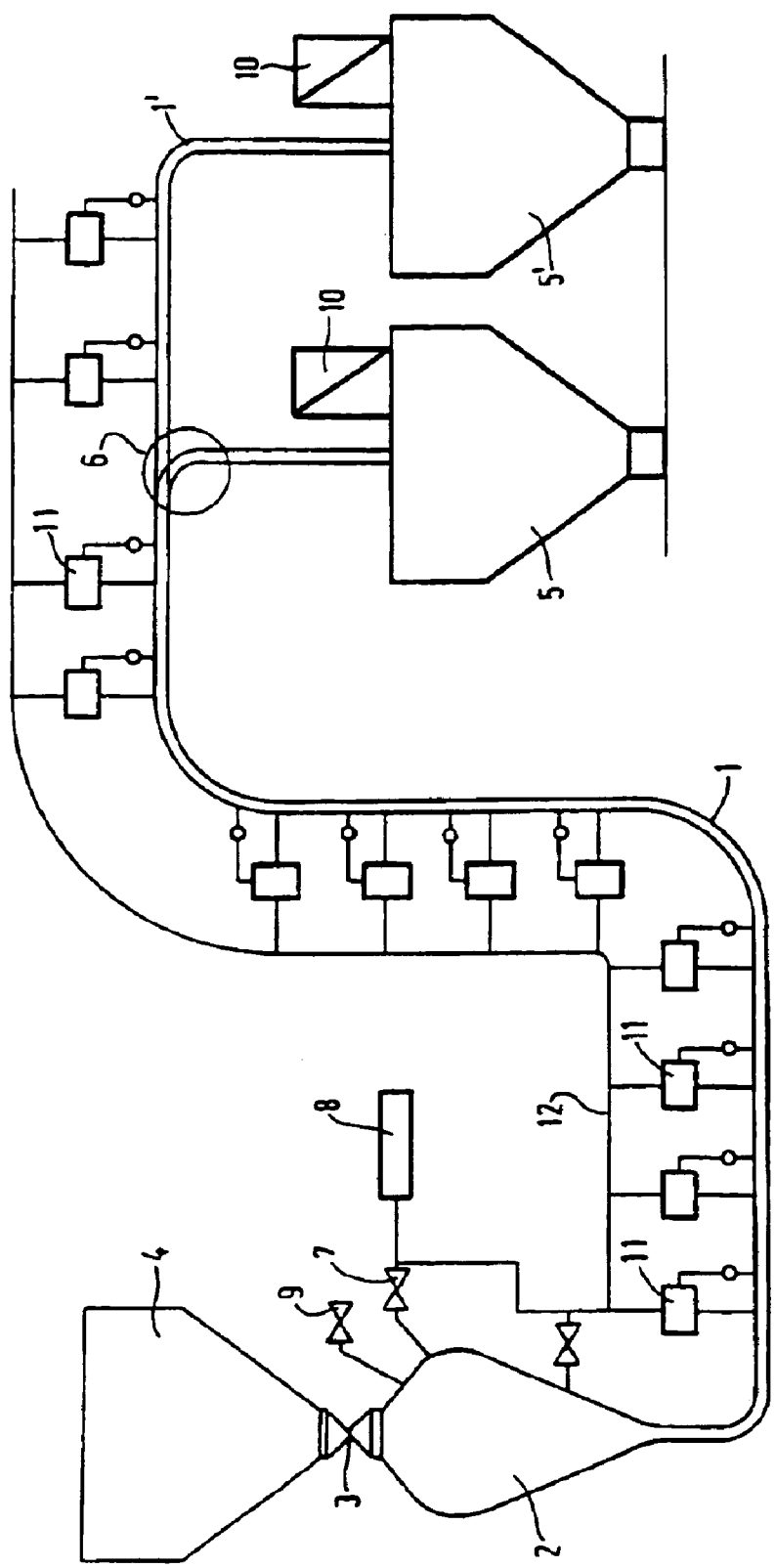

CONTROL MECHANISM, AN INSTALLATION AND A METHOD FOR TRANSPORTING BULK MATERIAL, GRANULAR MATERIAL OR POWDERY MATERIAL THROUGH A CONVEYOR LINE

This application is the U.S. National Stage of International Application No. PCT/EP01/03179, filed Mar. 16. 2001, which claims benefit of Dutch Patent Application No. 1014666, filed Mar. 16, 2000.

The invention relates to a control mechanism for use in an installation for transporting bulk material, granular material or powdery material through a conveyor line with the aid of a pressurized gaseous medium, which control mechanism is arranged for being connected to the conveyor line for the purpose of introducing a pressurized gaseous medium therein.

A control mechanism of this kind, used in combination with a conveyor line, is disclosed in International Patent Application WO 98/56696, wherein several control mechanisms are connected to the conveyor line between an intake point and an outlet point thereof. A remote control and monitoring device is provided for controlling the various control mechanisms, to which control and monitoring device the various control mechanism are electrically connected.

The control mechanisms make it possible to adapt the pressure of the gaseous medium in the conveyor line, and thus the velocity of the material being transported through the conveyor line, in a controlled manner by suitable metering the pressurized gaseous medium that is being supplied to the conveyor line by the control mechanisms.

It is advantageous to set the velocity at which the material is transported through the conveyor line such that the velocity will not be too low, which would increase the risk of blockages in the conveyor line, but on the other hand also such that the velocity will not be too high, either, in order to prevent the material, the conveyor line and further parts of the installation from being damaged.

In particular in environments where there is a risk of explosion, or in situations wherein the material to be transported itself embodies a risk of explosion, the maximum allowable velocity of the material in the conveyor line is also limited by the phenomenon of electrostatic charging, as will be appreciated by those skilled in the art. An economically advantageous control of the transport of material through the conveyor line is obtained when the ratio of the number of kg of material and the number of kg of used-up gaseous medium is very high. All this whilst maintaining the aforesaid requirements as regards the maximum transport velocity of the material, of course.

In practice, it is generally recommended to connect the control mechanisms to the conveyor line at regular intervals in the order of 0.5 m. When a transport velocity of the material of 10 ms/s is used, for example, the amount of time required before the material has passed successive control mechanisms will be in the order of 50 ms. It has been found that an adequate control of the transport velocity and material blockages, on the conditions as indicated above, and in particular when relatively long conveyor lines are used, is hardly or not possible, in view of the fact that the communication times between a control mechanism and a remote central control and monitoring circuit are too long to respond quickly and adequately to disturbances in the transport velocity of the material by controlling the pressure of the gaseous medium in the conveyor line via one or more of the control mechanisms.

Accordingly, it is a first object of the invention to provide a control mechanism which makes it possible to respond directly to a detected deviation in the transport of material in the conveyor line, such as blockage of the material.

According to the invention, this objective is accomplished in that the control mechanism comprises a connecting opening for connecting the control mechanism to an inlet in the conveyor line, an intake for gaseous medium, which is in communication with the connecting opening, a control valve, which operatively engages the intake, and means for sensing pressure of the gaseous medium in the conveyor line for directly controlling the control valve in response to the sensed pressure for the purpose of metering the pressurized gaseous medium that is being delivered to the connecting opening via the intake.

The control mechanism according to the invention provides a direct control of the control valve through its means for sensing the pressure of the gaseous medium in the conveyor line, thereby avoiding processing times of control mechanisms which are remotely controlled and which suffer from large response times, as indicated above.

In a first embodiment of the control mechanism according to the invention, the direct control of the control valve in response to the sensed pressure is mechanically solved, such that the control valve is directly mechanically controlled by the means for sensing the pressure of the gaseous medium in the conveyor line.

In a second embodiment of the control mechanism according to the present invention the control valve is of an electrically controlled type, and the means for sensing the pressure of the gaseous medium in the conveyor line are arranged for providing an electric signal for directly controlling the control valve in response to the electric signal.

In a third embodiment according to the invention, the control mechanism comprises means for sensing velocity of the material to be transported in the conveyor line, which means are arranged for providing an electric signal for directly controlling the control valve in response to the electric velocity signal.

The third embodiment of the invention provides not only control in response to the sensed pressure of the gaseous medium in the conveyor line but also in response to the velocity of the material to be transported through the conveyor line, by adjusting the metered amount of the gaseous medium that is being delivered to the connecting opening of the control mechanism.

In a yet further embodiment of the invention having a control valve of an electrically controlled type, electronic control and processing means are provided for processing the electric signal provided by the means for sensing the pressure of the gaseous medium in the conveyor line and/or the means for sensing the velocity of the material to be conveyed, and for controlling the control valve.

This embodiment of the invention is based on the insight that it is possible, by fitting each control mechanism with its own electronic control and processing means, to take a rather complex corrective action practically instantaneously by avoiding remote processing.

In a preferred embodiment of the control mechanism according to the invention, the electronic control and processing means include an input/output terminal for delivering the signal or signals associated with the sensed pressure and velocity to one or more further control mechanisms, or for receiving a respective electric signal from one or more further control mechanisms, for the purpose of controlling the metered amount of the pressurized gaseous medium being delivered to the connecting opening thereof, if desired.

In a practical embodiment of the control mechanism according to the invention, the connecting opening is made up of a first end of an elongated sleeve-shaped body, comprising a metering opening which is formed in the wall of the sleeve-shaped body, at a point some distance away from the first end, and which is in communication with the intake to which the control valve operatively engages.

In another embodiment of the control mechanism according to the invention, the means for sensing the pressure in the conveyor line comprise an elongated sensing element which is movably disposed in the longitudinal direction of the sleeve-shaped body, a first end of which terminates in the connecting opening, and a second end of which operatively engages the control valve.

For the purpose of providing an electric signal in response to the pressure in the conveyor line sensed by the pressure sensing element, in a still further embodiment of the control mechanism according to the present invention, the second end of the sensing element acts on a force sensor that is disposed in the sleeve-shaped body.

The force sensor may be a force sensor which is known perse, but preferably it comprises a strain gauge element.

In order to enable easy adjustment, adapted to a specific use, of the pressure range in which the control mechanism operates, another embodiment of the invention provides adjusting means which act on the force sensor from a second end of the sleeve-shaped body, such as an adjusting screw. The force exerted on the force sensor by the sensing element can be adjusted via the adjusting screw.

In a further embodiment of the control mechanism according to the invention, the means for sensing the velocity of the material in the conveyor line are arranged for detecting the sound produced by the material being transported in the conveyor line.

The sound detector may be a well-known sound sensor, but preferably it comprises a piezoelectric element. As persons skilled in the art will appreciate, the velocity of the material can be deduced by analysing the power density spectrum of the frequency spectrum of the sound recorded by the sound sensor.

In the embodiment of the control mechanism comprising the elongated sensing element that is movably disposed in the sleeve-shaped body, the recording of sound can be realised in that the sound sensor is in contact with the second end of a sensing element for the purpose of recording, via the sensing element, the sound that is produced in the conveyor line.

In order to prevent undesirable secondary noises of the installation, which are transmitted via the conveyor line, from being recorded, it is preferable for the sensing element to be movably disposed in the sleeve-shaped body, in such a manner that it is acoustically insulated from the wall thereof.

The control valve may be any suitable mechanically and/or electrically controlled control valve for metering a gaseous medium.

In the case of electrically controlled control valves for metering of the gaseous medium, and in particular when relatively long conveyor lines are used, it is important that a minimum amount of electric energy is required for actuating the control mechanisms. This is in particular important if the control mechanisms are used in environments where there is a risk of explosion or if the material to be transported through the conveyor line is highly explosive or flammable. In such hazardous situations it is undesirable, for example, to use relatively high control voltages and relatively high electric power values, in view of the risk of sparking, overheating and the like.

In a preferred embodiment of the electrically controlled embodiment of the control mechanism according to the invention, the control valve therefore comprises a piezoelectrically controlled valve element.

By using a piezoelectrically controlled control valve, only a relatively low amount of electric energy is required for the metering of the gaseous medium that is supplied to the control mechanism. This means a reduction not only of the overall electric power required for controlling a (possibly large) number of control mechanisms, but also of the heat development in comparison with, for example, electro dynamically energized control valves.

A suitable control valve for use in the control mechanism according to the invention comprises, in a yet further embodiment thereof, an elongated valve element, on a first end of which a driving element acts for the purpose of moving a second end of the valve element towards or away from the metering opening so as to increase or reduce the extent to which the metering opening is opened or closed.

This type of control valve, in a still further embodiment of the invention, is provided with a piezoelectric driving element built up of layers of a piezoelectric material, wherein the first end of the valve element is fixedly connected to the piezoelectric driving element, in such a manner that the valve element makes a swinging movement in longitudinal direction under the influence of an electric current being supplied to the piezoelectric driving element.

In yet another embodiment of the invention, another adjusting possibility of the control mechanism on the conveyor line is provided by fastening elements which are attached to the conveyor line and which engage the connecting opening thereof for adjustably mounting the sleeve-shaped body therein, with the first end of the sleeve-shaped body extending in the radial direction of the conveyor line.

In a simple, robust embodiment, the fastening elements comprise a threaded nut to be welded to the conveyor line, wherein the first end of the sleeve-shaped body, that is, the end which terminates in the connecting opening, is in the form of a threaded end to be screwed into the fastening means.

In a preferred embodiment of the control mechanism according to the invention, in order to keep the dimensions of the control mechanism as compact as possible, the sensing element comprises a bore extending in the longitudinal direction thereof, and at least one exit opening extending from the bore and opening near the first end of the sensing element, in the circumferential wall thereof, in which a non-return valve is mounted, wherein the bore connects to the metering opening near the second end of the sensing element, via an opening in the wall of the sensing element, in such a manner that gaseous medium can be supplied to the conveyor line from the metering opening, via the bore, the exit opening and the connecting opening.

The non-return valve may be a valve hose which surrounds the circumferential wall of the sensing element and which covers with one or all exit openings, which valve hose furthermore aids in acoustically insulating the sensing element from the sleeve-shaped body.

In order to prevent small particles entering the control mechanism from the conveyor line via the connecting opening, the invention, in another embodiment thereof, provides a further non-return valve in the form of a sealing ring which is disposed in the sleeve-shaped body, near the connecting opening, which sealing ring comprises a wall that moves out in radially inward direction under the influence of gaseous medium flowing from the connecting opening via the sleeve-shaped body under a pressure higher than a predetermined value.

In another embodiment of the invention, in order to enable their use in combination with a remote control and monitoring device, the electronic control and processing circuit and/or the means for producing an electric signal associated with the pressure of the gaseous medium in the conveyor line and with the velocity of the material to be transported in the conveyor line include transmission/reception means for exchanging data via a wired connection or a wireless connection.

In order to provide an as universal as possible control mechanism, the invention furthermore provides means connected to the electric control and processing circuit, for recording control parameters therein for controlling, on the basis of the aforesaid electric signal, the metering of gaseous medium that is being supplied to the conveyor line.

The transmission/reception means can be designed for exchanging data in accordance with any standard, so that standard components can be used to a large extent, which is advantageous with a view to keeping the cost of the control mechanism as low as possible, of course.

The invention furthermore relates to a method for transporting bulk material, granular material or powdery material through a conveyor line comprising an intake point and an outlet point, wherein the material is introduced into the conveyor line near the inlet point and transported to the outlet point by means of a pressurized gaseous medium, wherein control mechanisms of the electrically controlled type in accordance with the invention as disclosed above are connected to the conveyor line between the intake point and the outlet point, wherein according to the invention the pressure of the gaseous medium in the conveyor line and the velocity of the material being transported through the conveyor line, which are sensed by a control mechanism, are processed into control signals for anticipatory control, by electric means, of the metering of the gaseous medium supplied to the conveyor line by control mechanisms that are located further downstream and/or upstream.

Anticipatory control of the control mechanisms upstream and/or downstream of the conveyor line, based on the measuring results of a respective control mechanism, makes it possible to maintain a desired, stable velocity of the gaseous medium in the conveyor line.

Anticipatory control of the pressure of the gaseous medium in this manner makes it possible to transport the material in the conveyor line at the lowest possible velocity, thus minimizing the amount of wear on the installation as well as its maintenance costs, whilst also the risk of damage being caused to the material being transported is minimized.

For implementing the method according to the invention, the invention provides an installation for transporting bulk material, granular material or powdery material through a conveyor line by means of a pressurized gaseous medium, from an intake point to an outlet point thereof, comprising control mechanisms of the electrically controlled type in accordance with the present invention as disclosed above, which control mechanisms are connected to the conveyor line between the intake point and the outlet point, wherein a number of control mechanisms are connected to a local control and processing device with their transmission/reception means for the purpose of direct adjustment of a respective control mechanism, in response to the sensed pressure and velocity.

In the most comprehensive embodiment, the local control and processing device(s) is (are) connected to a central control and processing device for remote control and monitoring of the transport of material in the installation. Via this central control and processing device, control parameters can furthermore be transmitted to the various control mechanisms for controlling the transport of material through the conveyor line in a desired manner.

In the installation as disclosed above, control mechanisms in accordance with the present invention of the mechanically or electrically controlled type may be arranged along the conveyor line in an interposed manner.

The above disclosed embodiments of the control mechanism according to the invention are very advantageous, in that the control mechanisms are provided as a single, integral component and can be mounted on a conveyor line, either an existing conveyor line or a conveyor line of a new installation for transporting material by means of pressurized gaseous medium. The mechanically controlled first embodiment of the control mechanism according to the invention has the advantage that no electrical power is required for driving the control valve, such that these control mechanisms can operate completely autonomously.

The invention will now be explained in more detail with reference to the appended drawing.

FIG. 1 schematically shows a prior art installation for the transport of bulk material, granular material or powdery material through a conveyor line.

Figure 2:
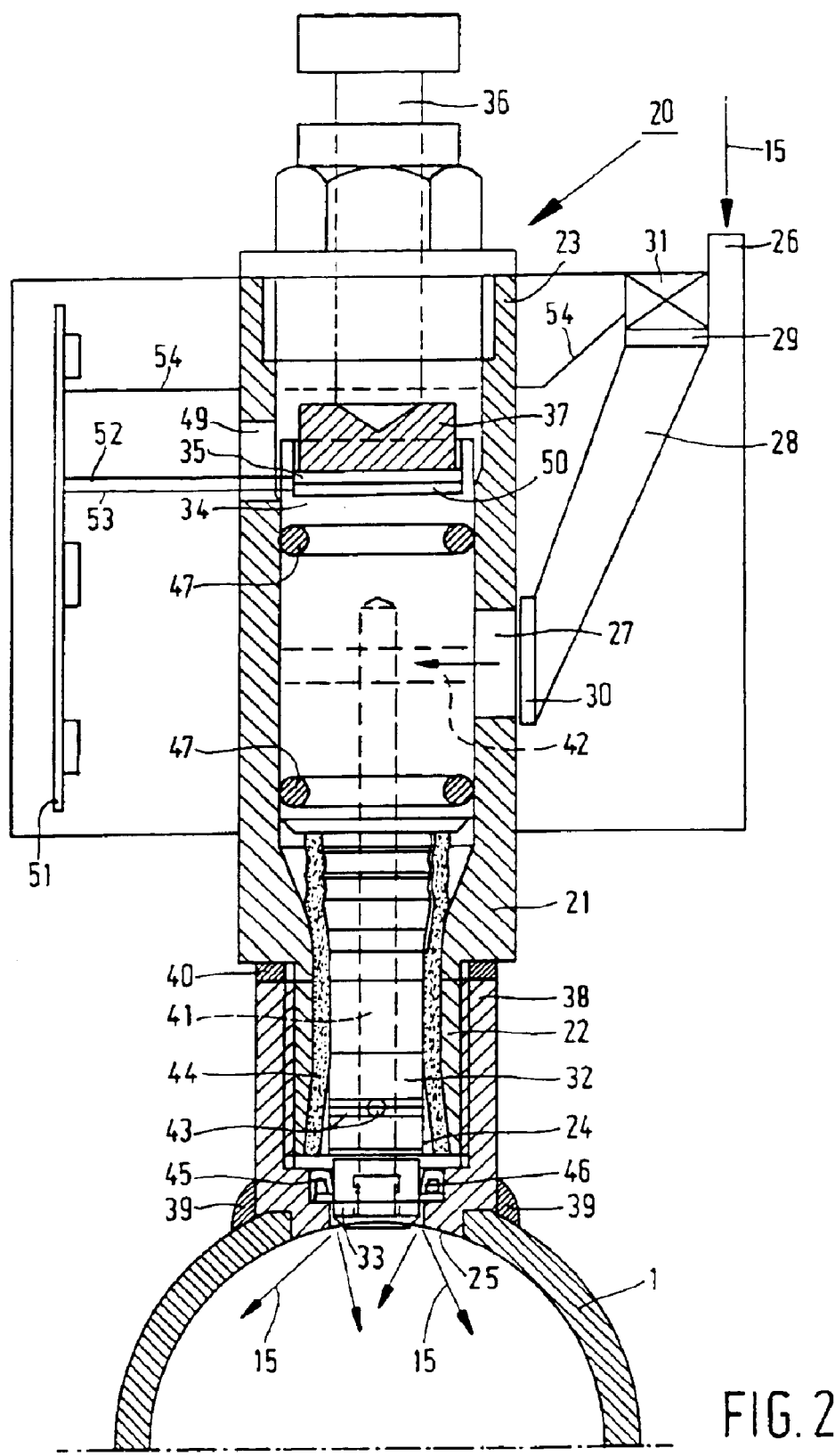

FIG. 2 schematically shows, in sectional view, a preferred embodiment of the electrically controlled control mechanism according to the invention.

Figure 3:
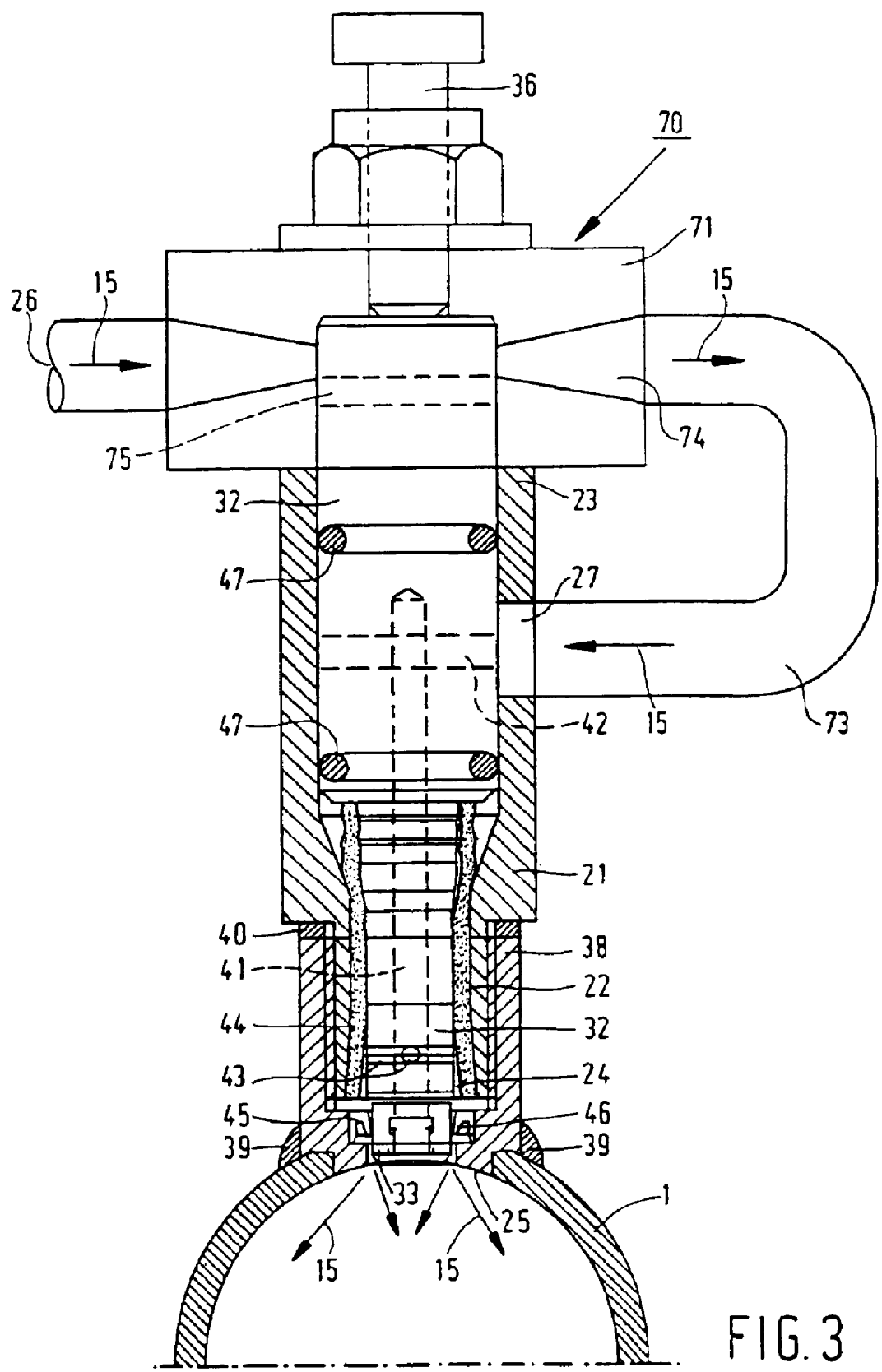

FIG. 3 schematically shows, in sectional view, a preferred embodiment of the mechanically controlled control mechanism according to the invention.

Figure 4:
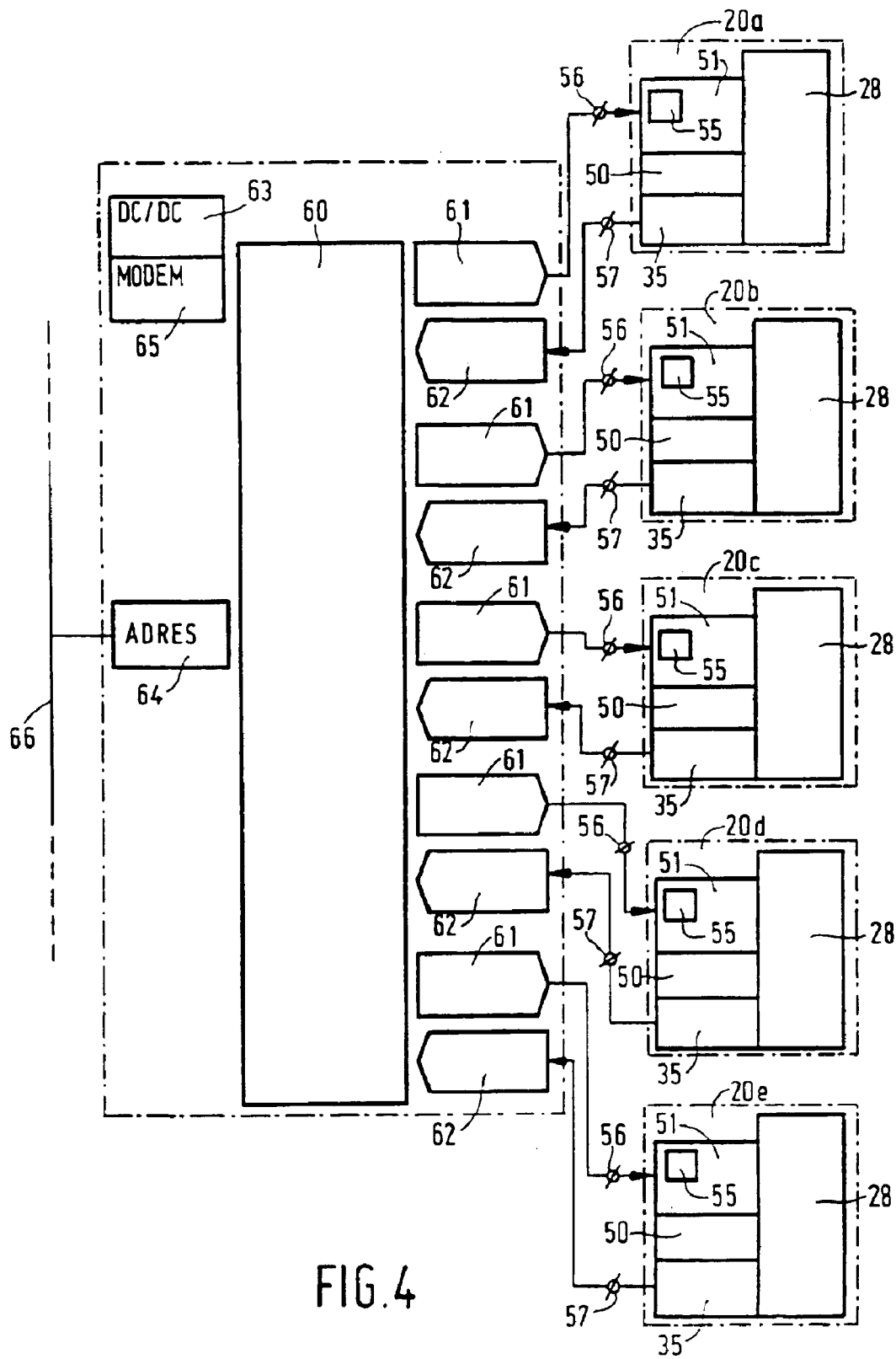

FIG. 4 is an electric block diagram of the electric components and the connections of a number of electrically controlled control mechanisms according to the invention, which are connected to a local control and monitoring device.

Figure 5:
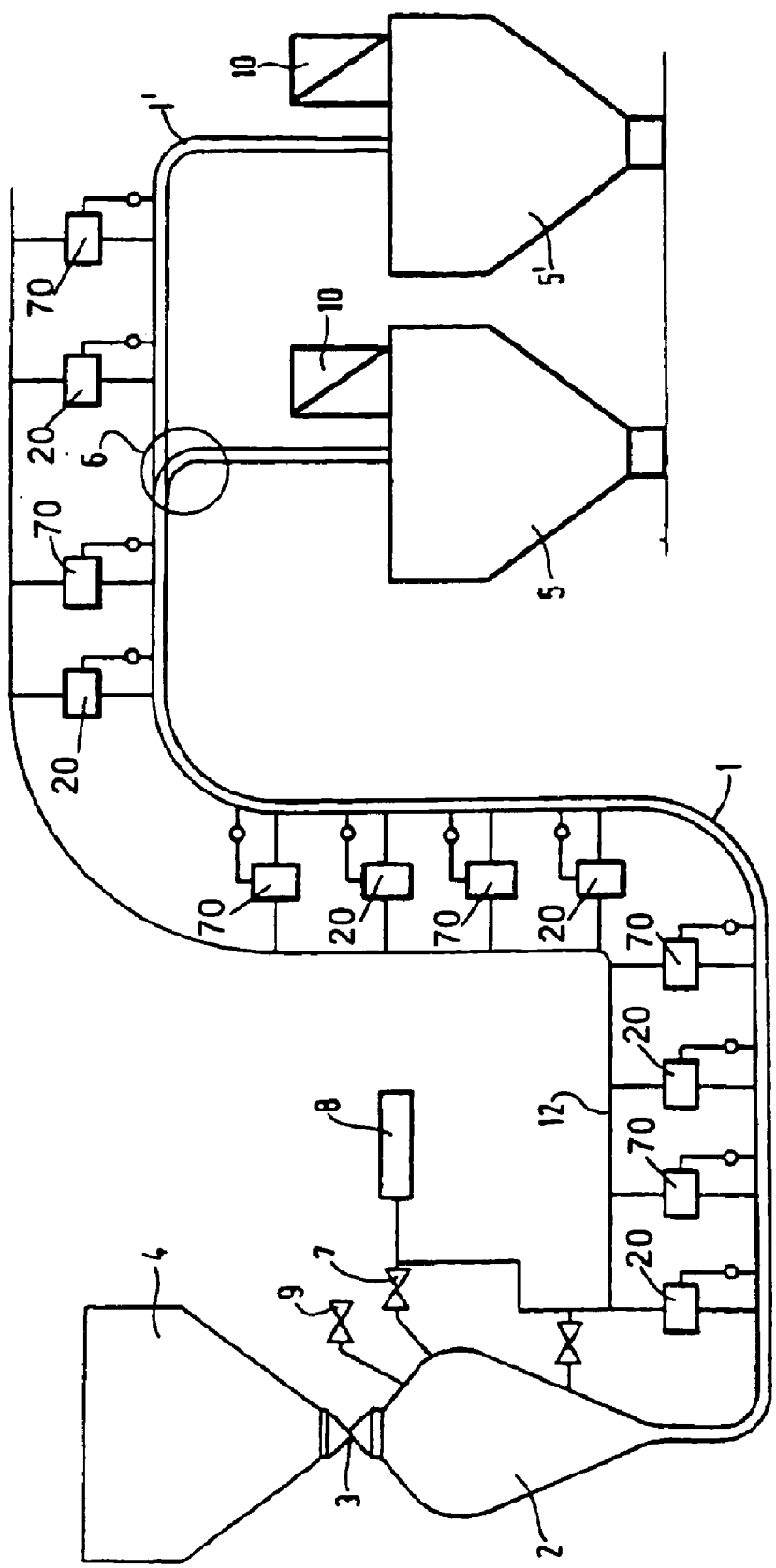

FIG. 5 schematically shows an installation according to the present invention for the transport of bulk material, granular material or powdery material through a conveyor line, using interposed electrically and mechanically controlled valve means.

As is shown in FIG. 1, a vessel 2 is connected to an intake point of a conveyor line 1. Vessel 2 is connected to a hopper 4 via a sluice mechanism 3 or the like. Furthermore, means for weighing vessel 2 may be provided.

Instead of being supplied from a single vessel 2, the conveyor line 1 may also be supplied with material to be transported from two or more vessels, as a result of which a more continuous transport of material can be achieved. Pressure vessel 2 may also consist of two cascade-connected pressure vessels with a closable connecting line there between, wherein one vessel can be filled whilst the other vessel is being emptied, thus enabling a continuous transport. A continuous transport of material can also be effected by using a screw conveyor or other conveying system, rather than one or more pressure vessels 2, for effecting a continuous supply of material to be transported (not shown) to conveyor line 1.

Near its end (or outlet point) remote from vessel 2, line 1 is connected to a storage vessel or hopper 5. Line 1 may be connected, via a change-over valve 6 (diagrammatically indicated), to an extension 1' of said line, via which material to be transported can be supplied to a further hopper 5'. It is also possible, of course, to provide more hoppers or the like for the storage of material.

The invention will be further illustrated hereafter on the basis of the batchwise transport of material under the influence of a pressurized gaseous medium, such as air, without ruling out the possibility of continuous transport or vacuum transport of the material through line 1.

Granular or powdery material which is to be transported can be supplied from hopper 4 to vessel 2 via sluice mechanism 3. After closure of the sluice mechanism 3, a pressurized gaseous medium can be introduced into vessel 2, via a valve 7 or the like, from a source 8 of pressurized gaseous medium, for example air, for the purpose of transporting the material through line 1 to hopper 5 and/or hopper 5'.

Once the amount of material present in vessel 2 has been carried off, the pressure in vessel 2 can be released by opening a valve 9, after which vessel 2 can be refilled.

Hoppers 5 and 5' are provided with filters 10, via which a gaseous medium, which has been used for the transport of the material, can escape from the hoppers.

As is furthermore schematically indicated in FIG. 1, a number of control mechanisms 11 are connected to conveyor line 1 between its intake point and its outlet point. The control mechanisms 11 are also connected to a line 12, which is in communication with a source 8 for pressurized gaseous medium.

FIG. 2 is a schematic, longitudinal sectional view of a preferred embodiment of an electrically controlled control mechanism according to the invention, as a whole indicated by reference numeral 20, which is mounted on a conveyor line 1, which is only shown in part.

Control mechanism 20 comprises an elongated, sleeve-shaped body 21 of stainless steel or plastic material, comprising a first end 22 and a second end 23.

Located near the first end 22 of sleeve-shaped body 21 is a connecting opening 24, which connects to an inlet 25 of conveyor line 1 in the mounted condition of the control mechanism 20.

Located near the second end 23 of sleeve-shaped body 21 is an intake 26 for a pressurized gaseous medium, for example from line 12 as shown in FIG. 1.

A metering opening 27 is present in the wall of sleeve-shaped body 21, between the first end 22 and the second end 23 thereof, which opening on the one hand connects to the intake 26, on the outside of sleeve-shaped body 21, and which on the other hand connects to connecting opening 24 of sleeve-shaped body 21, via the interior thereof.

The metering opening 27 is engaged by a second end 30 of a control valve element 28, a first end 29 of which can be mechanically pivoted by a piezoelectric driving element 31 in such a manner that the second end 30 of the control valve element 28 can be moved to a position for increasing or decreasing the extent to which the metering opening 27 is opened or closed. That is, the amount of gaseous medium delivered to connecting opening 24 of control mechanism 20 can be increased or reduced, for the purpose of regulating the pressure of the gaseous medium in conveyor line 1, by moving valve element 28.

The piezoelectric element 31 is built up of layers of a piezoelectric material, wherein first end 29 of valve element 28 is fixedly connected to the piezoelectric driving element 31. Valve element 28 will make a more or less swinging movement in longitudinal direction under the influence of an electric current that is supplied to piezoelectric driving element 31.

In the illustrated embodiment of the control mechanism, a movable elongated sensing element 32 of stainless steel is disposed in sleeve-shaped body 21, which element acts, with an end 34 thereof, on a force sensor 35, such as a strain gauge element, which delivers an electric signal in dependence on the force with which the sensing element 32 presses against the force sensor 35. Thus it is possible to measure the pressure of the medium in the conveyor line 1 by means of the force sensor 35.

From the second end 23 of sleeve-shaped body 21, adjusting means 36 in the form of an adjusting screw act on force sensor 35 via a packing piece 37, for the purpose of pre-adjusting a desired force range, which may depend on the pressure variations of the gaseous medium in conveyor line 1.

A further adjusting possibility in the longitudinal direction of sleeve-shaped body 21 is achieved in that the sleeve-shaped body 21 is connected with its first end 21, via a screwed connection, to a threaded nut or threaded sleeve 38 that is mounted on conveyor line 1. Threaded nut or threaded sleeve 38 is fixed to conveyor line 1 via welds 39. The depth over which sleeve-shaped body 21 is screwed into the threaded nut or threaded sleeve 38, and thus the extent to which sensing element 32 extends into conveyor line 1 with its first end 33, can be adjusted by means of a threaded adjusting ring 40.

Sensing element 32 includes a bore 41, which is closed near the first end 33 of sensing element 32, which opens into connecting opening 24, and which is open near the second end 34 of sensing element 32, at point 42 in the circumferential wall thereof, from where it communicates with metering opening 27 via sleeve-shaped body 21. Present in the wall of sensing element 32, near the first end 33 thereof, are one or more outlet openings 43, which connect to bore 41. A valve hose 44 surrounding the circumference of sensing body 32 covers outlet openings 43, which valve hose continues into sleeve-shaped body 21 and which is suitably clamped down on sensing element 32 near the first end 33 of the sensing element 32. Valve hose 44 acts as a first non-return valve in order to prevent gaseous medium flowing out of conveyor line 1 via control mechanism 20.

Present near the second end 33 of sensing element 32 is a second non-return valve 45 in the form of a sealing ring, whose wall 46 connecting to the sensing element 32 can move out under the influence of pressurized gaseous medium flowing from the connecting opening 24, in order to enable the gaseous medium to flow from the connecting opening 24 into the inlet opening 25 of the conveyor line. The pressure at which wall 46 moves out is 0.5 Bar, for example. Non-return valve 45 prevents fine particles of material penetrating into the control mechanism 20 from conveyor line 1.

Sensing element 32 is fitted with two O-rings 47 near the part of the sensing element that extends on either side of opening 42, which O-rings are in contact with the circumference of sensing element 32. These O-rings 47 provide an adequate seal, which functions to prevent pressurized gaseous medium that is supplied via metering opening 27 from finding its way into the space between sensing element 32 and the inside of sleeve-shaped body 21. Thus, gaseous medium being supplied via metering opening 27 can only travel to connecting opening 24 via opening 42 and bore 41.

In the illustrated embodiment, a sound sensor 50 in the form of a piezoelectric element is disposed between the second end 34 of sensing element 32 and force sensor 35. Piezoelectric element 50 is in contact with the second end 34 of sensing element 32, which also functions to transmit sound produced in conveyor line 1 by the material being transported therein. Since sensing element 32 is acoustically insulated from sleeve-shaped body 21 via valve hose 44 and O-rings 47, transmission of undesirable sounds from the installation to the sensing element 32 via the conveyor line 1 is effectively prevented.

Mounted on the outside of sleeve-shaped body 21 is furthermore an electronic control and processing circuit 51, which comprises electronic components and input/output terminals, on the one hand for energizing the piezoelectric driving unit 31 of valve element 28 and on the other hand for processing electric signals from force sensor 35 and sound sensor 50. The electric connections 52, 53, 54 to force sensor 35, sound sensor 50 and control valve 31 are effected via one or more passages 49 in sleeve-shaped body 21.

The operation of control mechanism 20 is as follows.

A pressurized gaseous medium 15, which may be air or a gas or an inert gas, that is supplied via intake 26 flows via metering opening 27 into bore 41 of sensing element 32, and through the outlet openings 43 and connecting opening 24 into inlet 25 of conveyor line 1.

Since the electronic control and processing circuit 51 is mounted directly on or near control mechanism 20, or is integral therewith, the signals received from force sensor 35 and sound sensor 50 can be directly processed on the spot and be converted into a suitable control signal for valve element 28 for the purpose of suitably metering pressurized gaseous medium 15 being supplied to conveyor line by the control mechanism 20 in question.

Those skilled in the art will appreciate that the piezo-electric control valve element 28 may have any other suitable form, such as an electrodynamic control valve, for example, for controlling the pressure of the gaseous medium supplied via the control mechanism from the intake 26 to the connecting opening 24.

FIG. 3 is a schematic, longitudinal sectional view of a preferred embodiment of a mechanically controlled control mechanism according to the invention, as a whole indicated by reference numeral 70, which is mounted on a conveyor line 1, which is only shown in part.

In the embodiments of FIGS. 2 and 3, like parts are designated by like reference numerals.

The movable sensing element 32 operatively engages a mechanical control valve 71, which is disposed at the second end 23 of the sleeve-shaped body 21. The control valve 71 comprises an intake 26 for pressurized gaseous medium 15 and an outlet 74 which connects through a hose or pipe 73 to the metering opening 27 of the sleeve-shaped body 21. The mechanical control valve 71 can be of any type suitable for the purpose of the present invention, in such a manner that the amount of pressurized gaseous medium 15 which can be brought into the conveyor line 1 at the connecting opening 24 of the control mechanism can be controlled in dependence of the sensing element 32.

Shown by way of example, in the embodiment of FIG. 3 the sensing element 32 is provided with a bore 75 extending in radial direction of the sensing element 32, at its end engaging the control valve 71.

If the pressure of the gaseous medium in the conveyor line 1 rises, for example due to a blockage upstream of the conveyor line 1, the sensing element 32 will be moved in the direction of the control valve 71, as a result of which a larger amount of pressurized gaseous medium 15 will be provided in the conveyor line 1 from the intake 26 to the metering opening 27 via the bore 75. If pressure in the conveyor line 1 drops, the sensing element, under influence of spring pressure or other biassing means, such as provided by the adjusting means 36, disclosed above in connection with FIG. 2, will move in the direction of the conveyor line 1 and a less amount of or even none pressurized gaseous medium 15 will flow in the conveyor line 1.

Those skilled in the art will appreciate that several other embodiments of the control valve 71 are possible, however without departing from the inventive idea of having an integral sensing and controlling mechanism for use with conveyor line material transport.

The embodiment of FIG. 2 may, for example, also be provided in a mechanically controlled version by replacing the force sensor 35 and the sound sensor 50, as well as the driving means 31, by a mechanical actuator (not shown) operating on the valve element 28 under the influence of the movement of the sensing element 32 in the sleeve-shaped body 21, in a manner as disclosed above for the electrically controlled embodiment of the invention. It will be appreciated that the control and processing circuit means 51 likewise may be abolished from the control mechanism 20.

FIG. 4 shows, in the form of a block diagram, a number of control mechanisms 20a–20e according to the invention, which are assumed to be connected in succession to conveyor line 1, wherein it is furthermore assumed for the purpose of a further explanation that the material flows from control mechanism 20a to control mechanism 20b, etc. Each control mechanism preferably comprises a piezoelectrically controlled control valve element 28, a pressure sensor 35, a sound sensor 50, as well as an electronic control and processing circuit 51.

Control mechanisms 20a–20e are connected to a local processor-controlled control and processing device 60, via input/output terminals 56, 57, by means of suitable signal conditioning circuits, such as transmission/reception circuits 61, 62, for the purpose of data exchange, which control and processing device 60 may in turn be connected, at 66, to a central control and processing device (not shown). The connections between control mechanisms 20a–20e and the local control and processing device 60 via transmission/reception circuits 61, 62 may be wired connections or wireless connections. Transmission/reception circuits 61, 62 are so arranged that they are capable of exchanging data in accordance with a generally recognized standard.

Local control and processing device 60 furthermore comprises a power supply portion 63 for electrically powering the various components and the control and processing circuits 51 of control mechanisms 20a–20e, as well as an addressing unit 64 for communication with the central control and processing device and/or a modem 65 for communication with remote equipment.

The processor-controlled processing device 60, which may be a so-called "Application Specific Integrated Circuit" (ASIC), is so arranged that, based on the pressure value and the velocity value of, respectively, the gaseous medium in the conveyor line 1 and the material transported therein that are sensed by, for example, control mechanism 20c during operation, the other control mechanisms 20a, b, d, e disposed downstream and/or upstream of the conveyor line 1 are adjusted in an anticipatory manner, in order to provide a desired stable transport of material in conveyor line 1.

In a preferred embodiment of the invention, the control and processing device 60 is so programmed that the pressure supplied to conveyor line 1 via piezoelectrically controlled control valve element 28 of control mechanisms 20a–e is set to achieve the lowest possible average transport velocity of the material in conveyor line 1. This means less wear on the installation as a whole, lower maintenance costs and a reduced risk of blockages and damage to the material being transported.

It will be appreciated that when a specific control mechanism, for example control mechanism 20c, establishes that the material in conveyor line 1 is flowing too slowly, anticipatory interference is possible by increasing the pressure of the gaseous medium upstream of the material transport, for example by injecting more gaseous medium into conveyor line 1 at the upstream control mechanisms 20a, 20b, and by reducing the pressure at the downstream control mechanisms 20d, 20e, if necessary. Corrective measures can also be taken directly at control mechanism 20, of course, since the electronic control and processing circuit is mounted directly at the control mechanisms in question, thus practically enabling real-time action.

It will be appreciated that when a number of local control and processing devices 60 are connected to each other and to a central control and processing device via a bus 66, or otherwise, it will also be possible, by a suitable exchange of measuring data, to interfere with the transport of material in the conveyor line at control mechanisms located further away than the directly adjacent control mechanisms that are connected to a local control and processing device 60.

In order to obtain an adequate control action, the electronic control and processing circuits 51 of the various control mechanisms 20a–e include storage means 55 for storing control parameters, which can vary in dependence on the installation, the type of material to be transported, etc. Instead of storing the control parameters in the electronic control and processing circuits 51, it is also possible to store these parameters in a local control and processing device 60. The setting of the control parameters may take place from a central control and processing device (not shown), if desired.

A variant of the installation of the invention which is more advantageous as regards cost may be one wherein not all control mechanisms 20a–e that are connected to a local control and processing device 60 have their own control and processing circuit 51, but wherein the control mechanisms can only be controlled from the local control and processing device 60. Although the direct, real-time adjusting possibility at a respective control mechanism itself is thus lost, in practice it is nevertheless possible to achieve a properly functioning transport of material at lower cost by using cheaper control mechanisms.

It will be appreciated that it is possible to connect any number of control mechanisms 20 to a local control and processing device 60. The minimum number is one control mechanism, of course.

The comprehensive facilities for data exchange between control mechanisms connected to a local control and processing device 60 and between various interconnected local control and processing devices 60 and a central control and processing device, if necessary, enable a very flexible control of the installation according to the invention whilst minimizing the cost of used-up gaseous medium (for example air) and the amount of wear.

It is possible for the purpose of the invention to use control circuits, force sensors and sound sensors that are known per se.

In practice, the control mechanism 70 according to the invention can be applied autonomously in any existing or new system for conveying materials through a conveying line 1, for controlling the pressure of the gaseous medium in the line 1. The control mechanism 20 and the control mechanism 70 according to the invention can be used together in the same installation, for example by arranging both types of control mechanisms in an interposed manner along the conveyor line 1, thereby reducing costs. This because the control mechanism 70 is much cheaper to manufacture than the control mechanism 20 according to the present invention.

FIG. 5 schematically shows an installation for the transport of bulk material, granular material, or powdery material through a conveyor line in accordance with FIG. 1, wherein electrically controlled valve means 20 and mechanically controlled valve means 70 are connected to the conveyor line 1 in an interposed manner.

What is claimed is:

1. A control mechanism for a pneumatic conveyor adapted for transporting bulk material,
   said control mechanism adapted for connection to said conveyor and for introducing a pressurized gaseous medium therein, said control mechanism comprising:
   a connecting opening adapted for connecting said control mechanism to an inlet in the conveyor line;
   an intake for gaseous medium, said intake being in communication with said connecting opening;
   a control valve operatively engaging said intake and adapted to control flow of the gaseous medium to the connecting opening via the intake;
   means for sensing pressure of the gaseous medium in the conveyor line; and
   means for directly controlling said control valve in response to said sensed pressure.

2. A control mechanism according to claim 1, wherein said control valve is electrically controlled, and wherein said pressure sensing means transmit an electrical signal for directly controlling said control valve in response to said electrical signal.

3. A control mechanism according to claim 2, further comprising means for sensing velocity of the bulk material in the conveyor line, said means for sensing the velocity transmitting an electrical signal for directly controlling said control valve in response to said electrical signal.

4. A control mechanism according to claim 2, further comprising electronic control and processing means for processing said electrical signal and for controlling said control valve.

5. A control mechanism according to claim 1, wherein said connecting opening comprises a first end of an elongated sleeve-shaped body, said sleeve-shaped body comprising a metering opening formed in a wall thereof, at a point remote from said first end, said metering opening in communication with said intake operatively engaged by said control valve.

6. A control mechanism according to claim 5, wherein said pressure sensing means comprise an elongated sensing element disposed for longitudinal movement within said sleeve-shaped body, a first end of said sensing element terminating in said connecting opening, and a second end of said sensing element operatively engaging said control valve.

7. A control mechanism according to claim 6, wherein said second end of said sensing element acts on a force sensor that is disposed in said sleeve-shaped body.

8. A control mechanism according to claim 7, wherein said force sensor is a strain gauge element.

9. A control mechanism according to claim 7, further comprising adjusting means acting on said force sensor from a second end of said sleeve-shaped body.

10. A control mechanism according to claim 5, wherein said control valve comprises an elongated valve element, and a driving element, said driving element acting on a first end of said elongated valve element to move a second end of said valve element towards or away from said metering opening so as to increase or reduce the extent to which said metering opening is opened or closed.

11. A control mechanism according to claim 10, wherein said control valve element externally engages said sleeve-shaped body.

12. A control mechanism according to claim 10, wherein said driving element is a piezoelectrically controlled driving element.

13. A control mechanism according to claim 12, wherein said piezoelectric driving element is built up of layers of a piezoelectric material, and wherein said first end of said valve element is fixedly connected to said piezoelectric driving element, such that said valve element makes a swinging longitudinal movement in response to an electric current supplied to said piezoelectric driving element.

14. A control mechanism according to claim 3, wherein said velocity sensing means comprise a sound sensor positioned to detecting the sound produced by the bulk material in the conveyor line.

15. A control mechanism according to claim 14, wherein said sound sensor is a piezoelectric element.

16. A control mechanism according to claim 14, wherein said connecting opening comprises a first end of an elongated sleeve-shaped body, said sleeve-shaped body comprising a metering opening formed in the wall thereof, at a point remote from said first end, said metering opening in communication with said intake operatively engaged by said control valve, wherein said pressure sensing means comprise an elongated sensing element disposed for longitudinal movement within said sleeve-shaped body, a first end of said sensing element terminating in said connecting opening, and a second end of said sensing element operatively engaging said control valve, and wherein said sound sensor is in contact with said second end of said sensing element and sensing via said sensing element the sound that is produced by the material during transport in the conveyor line.

17. A control mechanism according to claim 16, wherein said sensing element is acoustically insulated from the wall of said sleeve-shaped body.

18. A control mechanism according to claim 1, wherein said pressure sensing means comprise an elongated sensing element disposed for longitudinal movement within said sleeve-shaped body, a first end of said sensing element terminating in said connecting opening and a second end of said sensing element operatively engaging said control valve, and wherein said sensing element comprises a longitudinal bore, at least one exit opening extending from said bore and opening near said first end of said sensing element, in a circumferential wall thereof, and a non-return valve mounted in the at least one exit opening, wherein said bore connects to said metering opening near said second end of said sensing element, via an opening in the wall of said sensing element, whereby gaseous medium can be supplied to the conveyor line from said metering opening via said bore, said exit opening, and said connecting opening.

19. A control mechanism according to claim 18, wherein said non-return valve is a valve hose which surrounds the circumferential wall of said sensing element and which covers at least one exit openings.

20. A control mechanism according to claim 1, wherein said connecting opening comprises a first end of an elongated sleeve-shaped body, said sleeve-shaped body comprising a metering opening formed in a wall thereof, at a point remote from said first end, said metering opening in communication with said intake operatively engaged by said control valve, and wherein a further non-return valve in the form of a sealing ring is disposed in said sleeve-shaped body, near said connecting opening, which sealing ring comprises an outer wall that moves out in radially inward direction under the influence of gaseous medium flowing from said connecting opening, via said sleeve-shaped body under a pressure higher than a predetermined value.

21. A control mechanism according to claim 5, further comprising a fastening elements attached to said conveyor line and in contact with said inlet thereof, said fastening element adapted for adjustably mounting said sleeve-shaped body therein, with said first end of said sleeve-shaped body extending radially with respect to said conveyor line.

22. A control mechanism according to claim 21, wherein said fastening elements comprises a threaded nut adapted to be welded to the conveyor line, and wherein said first end of said sleeve-shaped body comprises a threaded end adapted to be screwed into said fastening means.

23. A control mechanism according to claim 1, further comprising means for producing an electrical signal associated with at least one of the pressure of the gaseous medium in the conveyor line and the velocity of the material to be transported in the conveyor line, said means including transmission/reception means for exchanging data with a remote control and monitoring device.

24. A control mechanism according to claim 23, further comprising an electronic control and processing circuit for processing said electrical signal and controlling said control valve, wherein said electronic control and processing circuit includes means for recording control parameters therein.

25. A method for transporting bulk material, through a conveyor line having an intake point, an outlet point, and a plurality of control mechanisms connected to the conveyor line at control points in a spaced-apart relationship between the intake point and the outlet point, comprising:

introducing the bulk material into the conveyor line near said intake point and transporting said material to said outlet point by a pressurized gaseous medium;

sensing the pressure of the gaseous medium in the conveyor line and the velocity of the material being transported through the conveyor line at a sensing point selected from the control points;

processing the sensed pressure and velocity to generate control signals for anticipatory control of the flow rate of the gaseous medium into the conveyor line at control points downstream and/or upstream of the sensing point.

26. A method according to claim 25, wherein the gaseous medium that is supplied to the conveyor line at said upstream and downstream control points is metered to maintaining a stable pressure in the conveyor line, so as to transport the bulk material at the lowest possible average pressure.

27. An installation for transporting bulk material, through a conveyor line by a pressurized gaseous medium, from an intake point to an outlet point thereof, comprising a plurality of control mechanisms adapted for connection to said conveyor and for introducing a pressurized gaseous medium therein, each said control mechanism comprising:

a connecting opening adapted for connecting said control mechanism to an inlet in the conveyor line;

an intake for gaseous medium, said intake being in communication with said connecting opening;

a control valve operatively engaging said intake and adapted to control flow of the gaseous medium to the connecting opening via the intake;

means for sensing pressure of the gaseous medium in the conveyor line; and means for directly controlling said control valve in response to said sensed pressure, which control mechanisms are connected to the conveyor line between said intake point and said outlet point.

28. An installation according to claim 27, wherein control mechanisms with and without electrically controlled valve means are connected to said conveyor line in an interposed manner.

29. An installation according to claim 27, wherein said plurality of control mechanisms comprise data transmission/reception means whereby said control mechanisms are connected to a local control and processing device, wherein a respective control mechanism is directly adjusted in response to pressure and velocity measurements transmitted by control mechanisms upstream and downstream of the respective control mechanism.

30. An installation according to claim 29, wherein said local control and processing device is connected to a central control and processing device for remote control and monitoring of the transport of material in the installation.

\* \* \* \* \*

UNITED STATES PATENT AND TRADEMARK OFFICE
CERTIFICATE OF CORRECTION

PATENT NO. : 6,935,813 B2
DATED : August 30, 2005
INVENTOR(S) : Cornelius Ludovicus Antonius Van Dorst It is certified that error appears in the above-identified patent and that said Letters Patent is hereby corrected as shown below:

Column 13,
Line 10, replace "detecting" with -- detect --.
Line 66, replace "elements" with -- element --.

Column 14,
Line 5, replace "elements" with -- element --.
Line 44, replace "maintaining" with -- maintain --.

Signed and Sealed this

Thirtieth Day of May, 2006

JON W. DUDAS
*Director of the United States Patent and Trademark Office*